United States Patent
Toyoda et al.

(10) Patent No.: US 7,159,885 B2
(45) Date of Patent: Jan. 9, 2007

(54) VEHICLE FRAME STRUCTURE FOR MOTORCYCLES

(75) Inventors: Hidetoshi Toyoda, Saitama (JP); Shogo Kanaumi, Saitama (JP); Yuzuru Ishikawa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/041,489

(22) Filed: Jan. 10, 2002

(65) Prior Publication Data

US 2002/0089145 A1  Jul. 11, 2002

(30) Foreign Application Priority Data

Jan. 10, 2001 (JP) ............................. 2001-003114

(51) Int. Cl.
 *B62K 25/04* (2006.01)
(52) U.S. Cl. ...................... 280/284; 180/227
(58) Field of Classification Search .............. 180/227, 180/219; 280/275, 284, 285
See application file for complete search history.

(56) References Cited

U.S. PATENT DOCUMENTS

| | | | | |
|---|---|---|---|---|
| 4,415,057 A * | 11/1983 | Yamaguchi | ................ | 180/227 |
| 4,440,413 A * | 4/1984 | Miyakoshi et al. | .......... | 280/284 |
| 4,457,393 A * | 7/1984 | Tamaki et al. | .............. | 180/227 |
| 4,463,964 A * | 8/1984 | Takayanagi et al. | ........ | 280/284 |
| 4,523,659 A * | 6/1985 | Yamamoto et al. | ......... | 180/227 |
| 4,596,302 A * | 6/1986 | Suzuki et al. | ............... | 180/227 |
| 4,706,774 A | 11/1987 | Tsuboi | | |
| 4,712,638 A * | 12/1987 | Kawaguchi et al. | ........ | 180/219 |
| 4,723,617 A * | 2/1988 | Kitada | ....................... | 180/68.1 |
| 4,724,920 A * | 2/1988 | Tsuchida et al. | ............ | 180/227 |
| 4,928,781 A * | 5/1990 | Kawano | .................... | 180/227 |
| 5,012,883 A * | 5/1991 | Hiramatsu | .................. | 180/225 |
| 5,062,495 A * | 11/1991 | Padgett | ....................... | 180/227 |
| 5,469,930 A * | 11/1995 | Wiers | ......................... | 180/227 |
| 5,975,230 A * | 11/1999 | Bourget | ...................... | 180/225 |
| 6,290,015 B1 * | 9/2001 | Horii et al. | ................. | 180/219 |
| 6,481,523 B1 * | 11/2002 | Noro et al. | ................. | 180/227 |
| 2002/0027035 A1 * | 3/2002 | Gogo | ......................... | 180/227 |
| 2002/0144850 A1 * | 10/2002 | Gogo | ......................... | 180/227 |
| 2003/0006577 A1 * | 1/2003 | Toyoda | ...................... | 280/227 |

FOREIGN PATENT DOCUMENTS

JP  05278664 A  * 10/1993
JP  02 945094 B  6/1999

(Continued)

*Primary Examiner*—Lesley D. Morris
*Assistant Examiner*—Daniel Yeagley
(74) *Attorney, Agent, or Firm*—Birch, Stewart, Kolasch & Birch, LLP

(57) ABSTRACT

A rear cushion unit has an upper end mounted on a swing arm and a lower end coupled to pivot brackets in a position below a pivot shaft. The pivot brackets are independent of each other and are not coupled to each other. With the above construction, a fuel tank, electric parts, or other parts, for example, can be clustered between the left and right brackets. Accordingly, the parts can be disposed near the center of gravity of the vehicle body. Therefore, the maneuvering capability of racing and off-road vehicles incorporating such an arrangement can be increased. The vehicle frame can be simplified in structure and can be manufactured at a reduced cost. When the vehicle is assembled, the distance that the worker needs to move can be reduced, and hence the productivity of the vehicle is increased. The size of the vehicle is reduced because of the clustered arrangement of the parts.

13 Claims, 7 Drawing Sheets

FOREIGN PATENT DOCUMENTS

| | | |
|---|---|---|
| JP | 2945094 | 6/1999 |
| JP | 02 963337 B | 8/1999 |
| JP | 2963337 | 8/1999 |
| JP | 2000190888 A * | 7/2000 |
| WO | WO 00 12376 A | 3/2000 |

* cited by examiner

VEHICLE FRAME STRUCTURE FOR MOTORCYCLES

CROSS-REFERENCES TO RELATED APPLICATIONS

This nonprovisional application claims priority under 35 U.S.C. §119(a) on Patent Application No. 2001-003114 filed in Japan on Jan. 10, 2001.

BACKGROUND OF THE INVENTION

1. Field of the Invention

The present invention relates to a vehicle frame structure for motorcycles which is suitable for increasing the maneuvering capability of the vehicle, improving the productivity at the time the vehicle body is assembled, reducing the size of the vehicle, and simplifying the vehicle frame structure.

2. Description of Background Art

Known vehicle frame structures for motorcycles are disclosed in, for example, ① Japanese patent No. 2945094 entitled "Electric two-wheeled vehicle" and ② Japanese patent No. 2963337 entitled "Motorcycle".

FIG. 5 of the above publication ① shows a motorcycle having left and right main frames 13 extending rearwardly from a head tube 12. A swing arm 24 is swingably mounted on rear portions of the main frames 13 by a pivot shaft 23. A rear wheel 29 is mounted on a rear end of the swing arm 24. Furthermore, a cushion unit 30 (see FIG. 1) is interposed between the swing arm 24 and the main frames 13.

FIG. 6 of the above publication ① shows a vehicle frame 11 having a battery case 70 mounted between the main frames 13 and a battery 68 housed in the battery case 70.

FIG. 1 of the above publication ② shows a motorcycle having a main frame 4 extending rearwardly from a head pipe 2. An engine 6 is mounted on the main frame 4. A swing arm 5 is swingably mounted on a rear portion of the main frame 4 by a pivot shaft 49. A rear wheel 7 is mounted on a rear portion of the swing arm 5. Furthermore, a shock unit 11 has a lower end attached to a lower portion of the swing arm 5 by a link 13 and an upper end attached to a crankcase 12 of the engine 6.

FIG. 2 of the above publication ② shows the main frame 4 in plan.

Generally, vehicle frames have left and right main frames extending rearwardly from a head tube. Since the main frames are widely spaced apart from each other, electric parts or other parts can be disposed in the space between the main frames. According to the arrangement shown in the above publication ①, the space between the rear upper portions of the main frames 13 is small because the end of the cushion unit 30 is attached to the rear upper portions of the main frames 13.

Inasmuch as parts to be disposed in the space between the rear upper portions of the main frames 13 need to be disposed separately in other locations, their weights are distributed, posing disadvantages on racing or off-road vehicles which require high maneuvering capabilities.

With the parts being disposed separately, the worker needs to install the parts on the vehicle while moving around. This results in a reduction in productivity and an increase in the size of the vehicle.

According to the arrangement shown in the above publication ①, the battery case 70 is mounted between the main frames 13. Accordingly, the manpower required to manufacture the motor vehicle is increased and the cost to manufacture the motor vehicle is also increased.

According to the arrangement shown in the above publication ②, the upper end of the shock unit 11 is attached to the crankcase 12 of the engine 6 which is positioned higher than the rear end of the main frame 4. Accordingly, the space between the rear portions of the main frame 4 cannot be utilized as effectively as the arrangement shown in the above publication ①.

SUMMARY OF THE INVENTION

It is therefore an object of the present invention to provide a vehicle frame structure for motorcycles which allows parts to be clustered at the center of the vehicle body, for thereby increasing the maneuvering capability of the vehicle, simplifying the structure of the vehicle frame, improving the productivity at the time the vehicle body is assembled, and reducing the size of the vehicle.

To achieve the above object, in accordance with a first aspect of the present invention, a vehicle frame structure for a motorcycle has a pair of left and right main frames extending rearwardly from a head pipe. Brackets are mounted on respective rear ends of the main frames. Furthermore, a pivot shaft extends between the brackets with a rear wheel supporting swing arm vertically swingably mounted on the pivot shaft. The vehicle frame structure includes a cushion unit which has an upper end mounted on the swing arm and a lower end coupled to the brackets in a position below the pivot shaft. The brackets are independent of each other and are not coupled to each other.

Since the left and right brackets are independent of each other and are not coupled to each other, a fuel tank, electric parts, or other parts, for example, can be clustered between the left and right brackets. Accordingly, the parts can be disposed near the center of gravity of the vehicle body. Therefore, the maneuvering capability of racing and off-road vehicles incorporating such an arrangement can be increased.

As compared with a conventional arrangement in which a cross pipe is mounted on a vehicle frame, the vehicle frame constructed of the main frames and the brackets according to the present invention is simple in structure, resulting in a reduction in the cost to manufacture the vehicle frame.

When the vehicle is assembled, the distance that the worker needs to move can be reduced. Accordingly, the productivity of the vehicle is increased. Furthermore, the size of the vehicle is reduced because of the clustered arrangement of the parts.

According to a second aspect of the present invention, a vehicle frame structure for a motorcycle has a pair of left and right main frames extending rearwardly from a head pipe. Brackets are mounted on respective rear ends of the main frames. Furthermore, a pivot shaft extends between the brackets with a rear wheel supporting swing arm vertically swingably mounted on the pivot shaft. The vehicle frame structure includes a cushion unit which has an upper end mounted on the swing arm and a lower end coupled to the brackets in a position below the pivot shaft. The brackets have respective lower ends coupled to a cross beam.

Because the lower ends of the left and right brackets are coupled to each other by the cross beam, a fuel tank, electric parts, or other parts, for example, can be clustered between the upper portions of the left and right brackets. Accordingly, the parts can be disposed near the center of gravity of the vehicle body. Therefore, the maneuvering capability of racing and off-road vehicles incorporating such an arrangement can be increased.

Furthermore, the size of the vehicle is reduced because of the clustered arrangement of the parts.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
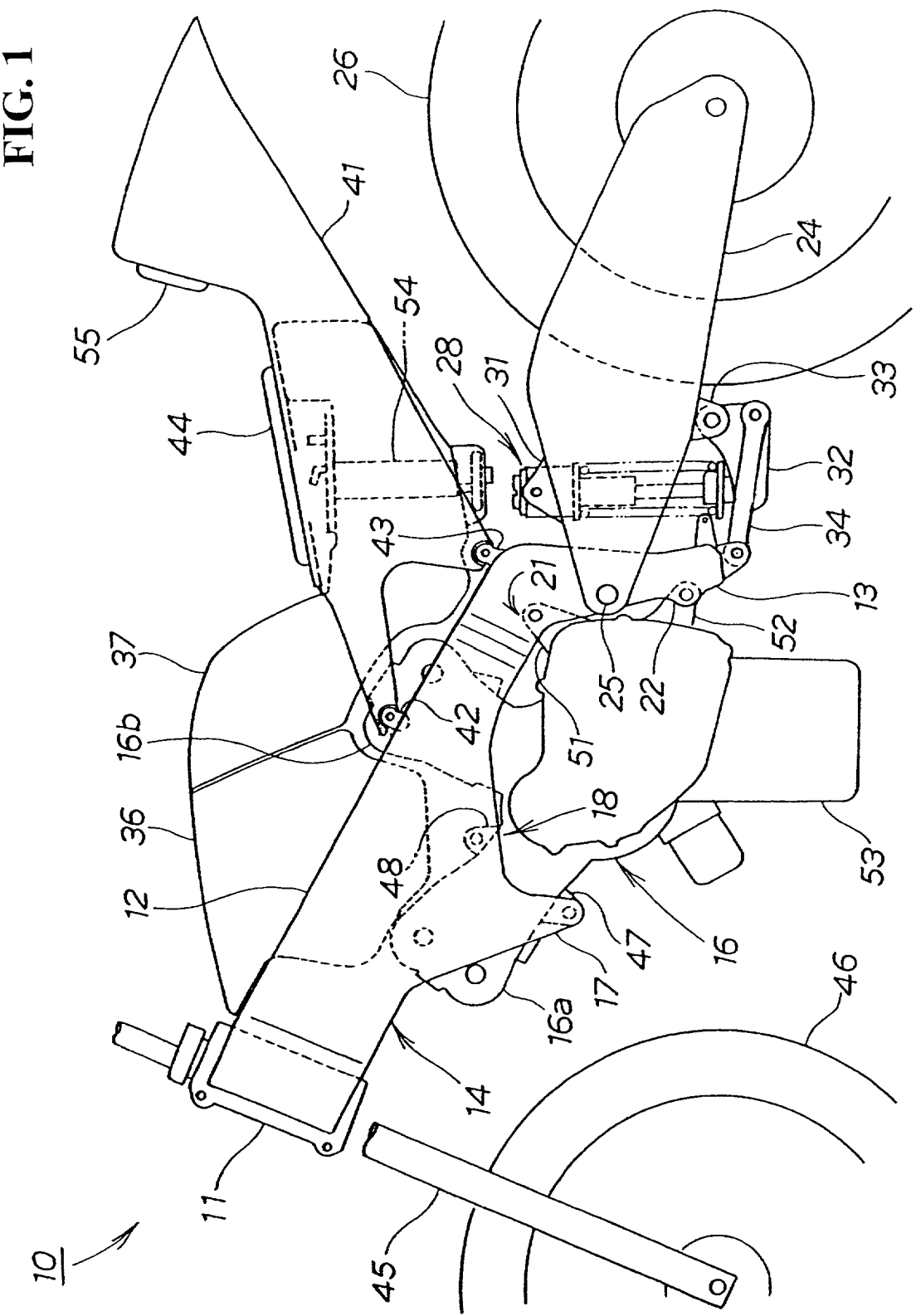
FIG. 1 is a fragmentary side elevational view of a motorcycle incorporating a vehicle frame structure according to the present invention.

Embodiments of the present invention will be described below with reference to the accompanying drawings. The figures should be viewed in the direction in which the reference characters are oriented.

FIG. 1 is a fragmentary side elevational view of a motorcycle incorporating a vehicle frame structure according to the present invention. The motorcycle 10 includes a vehicle frame 14 having a pair of left and right main frames 12 (the main frame 12 remote from the viewer is not shown) extending rearwardly (specifically, rearwardly and obliquely downwardly) from a head pipe 11. Pivot brackets 13 (the pivot bracket 13 remote from the viewer is not shown) are mounted as brackets on rear portions of the respective main frames 12.

A V-shaped engine 16 has a front cylinder 16a and a rear cylinder 16b and is mounted on respective engine attachments 17, 18 of the main frames 12 and respective engine attachments 21, 22 of the pivot brackets 13.

A swing arm 24 is swingably mounted on a pivot shaft 25 extending between the pivot brackets 13. A rear wheel 26 is mounted on a rear end of the swing arm 24.

A rear cushion unit 28 has an upper end attached to an upper bracket 31 disposed on an upper portion of the swing arm 24 and a lower end attached to a lower bracket 33 disposed on a lower portion of the swing arm 24 by a first link 32. The first link 32 is attached to respective lower ends of the pivot brackets 13 by a second link 34.

An intake air box 36 serves to temporarily store air in order to supply air to the engine 16. The intake air box 36 is mounted on upper portions of the main frames 12.

A fuel tank 37 is disposed upwardly of the main frames 12 and rearwardly of and closely to the intake air box 36.

A rear fender 41 has a front portion connected to cowl attachments 42, 43 disposed on the upper portions of the main frames 12. The rear fender 41 is disposed above the fuel tank 37 in covering relation thereto and above the rear wheel 26 in covering relation thereto. A rider's seat 44 is mounted on an upper surface of the rear fender 41 above the fuel tank 37.

A front fork 45 is steerably attached to the head pipe 11. A front wheel 46 is mounted on the lower end of the front fork 45. The engine 16 has hangers 47, 48 by which the engine 16 is mounted on the main frames 12, and hangers 51, 52 by which the engine 16 is mounted on the pivot brackets 13. An oil pan 53 is mounted on a lower portion of the engine 16. A fuel pump 54 is disposed in the fuel tank 37. A seat back 55 is mounted on the rear fender 41 behind the rider's seat 44.

Figure 2:
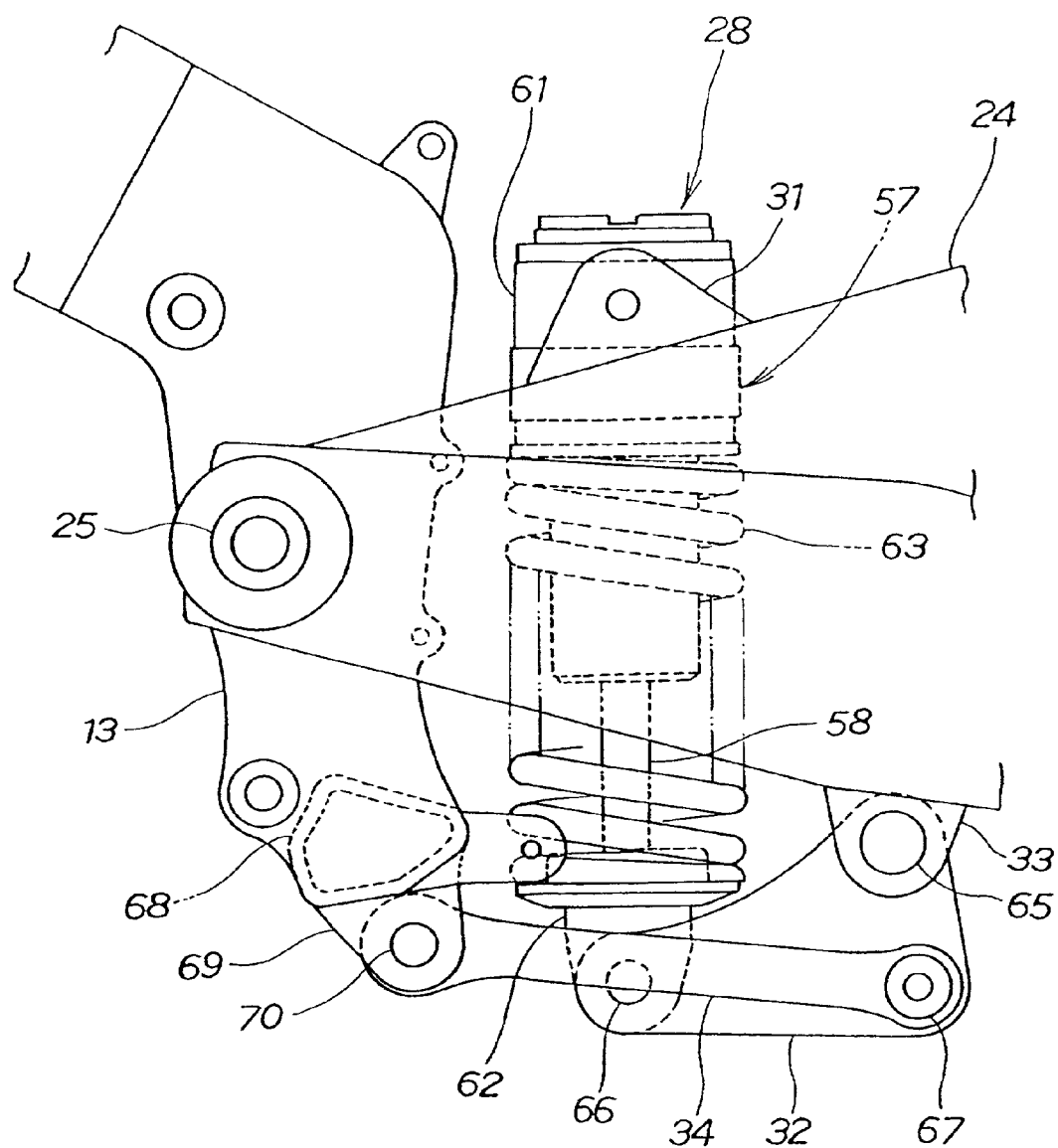
FIG. 2 is a fragmentary side elevational view of a rear cushion unit which is disposed close to a vehicle frame according to the present invention.

FIG. 2 is a fragmentary side elevational view of the rear cushion unit 28 which is disposed close to the vehicle frame according to the present invention. The rear cushion unit 28 includes a cylinder 57 filled with oil, a piston (not shown) movably inserted in the cylinder 57, a piston rod 58 connected to the piston, a swing arm attachment 61 mounted on an end of the cylinder 57 for attachment to the upper bracket 31 of the swing arm 24, a link attachment 62 mounted on an end of the piston rod 58 for attachment to the first link 32, and a spring 63 interposed between the swing arm attachment 61 and the link attachment 62.

The first link 32 has three support shafts 65, 66, 67. The first link 32 is swingably mounted on the lower bracket 33 by the support shaft 65 and swingably mounted on the rear cushion unit 28 by the support shaft 66. The second link 34 is swingably mounted on the first link 32 by the support shaft 67.

The second link 34 is swingably mounted by a support shaft 70 by two link attachments 69 (the link attachment 69 remote from the viewer is not shown) disposed on a cross beam 68 which interconnects the lower ends of the pivot brackets 13.

Figure 3:
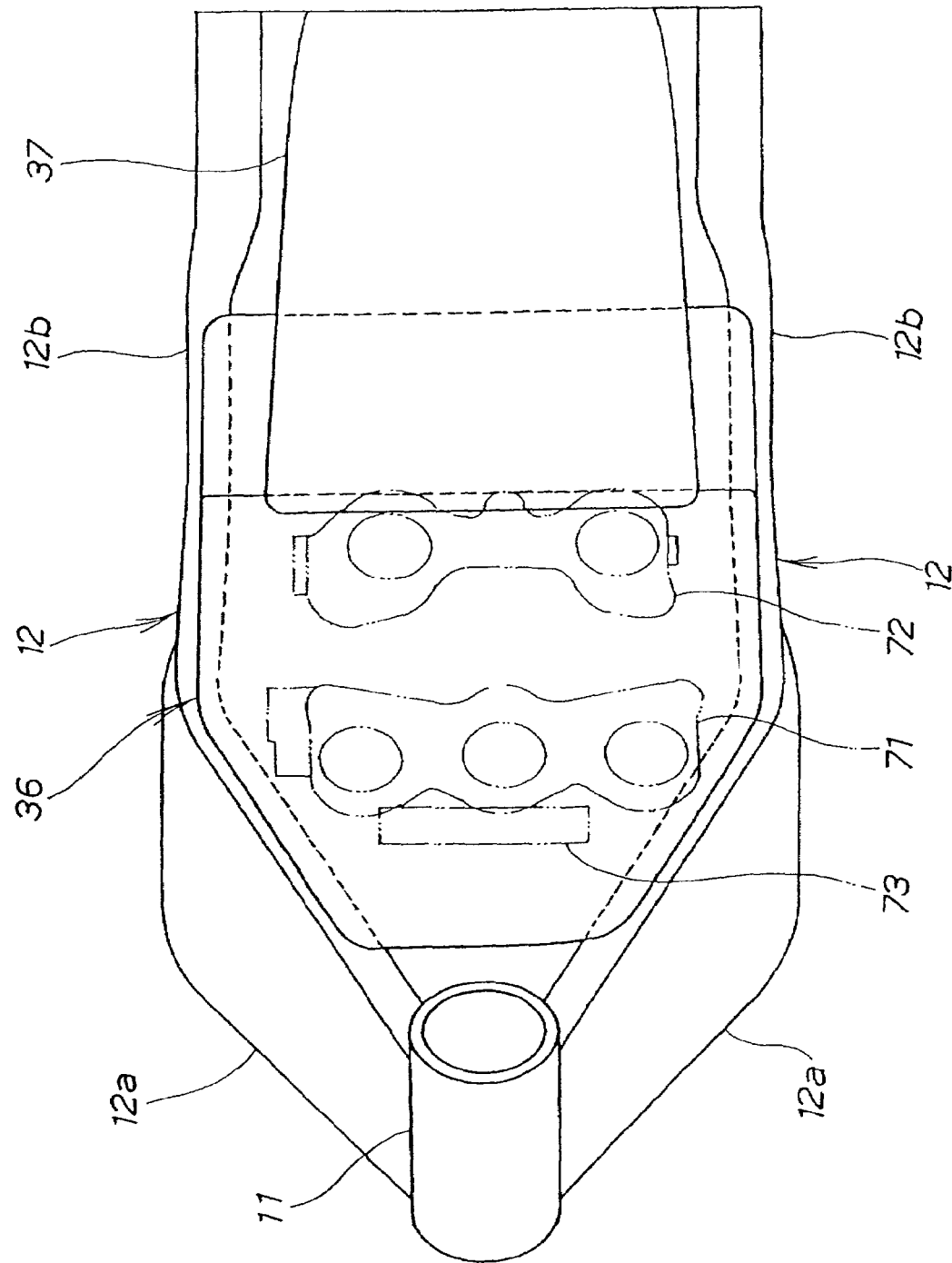
FIG. 3 is a plan view of the motorcycle according to the present invention.

FIG. 3 is a plan view of the motorcycle according to the present invention. The left and right main frames 12 have respective inclined portions 12a spreading rearwardly from the head pipe 11 and respective parallel portions 12b extending substantially parallel to each other rearwardly from the rear ends of the inclined portions 12a. The intake air box 36 is disposed on the upper portions of the left and right main frames 12. The fuel tank 37 is disposed rearwardly of and adjacent to the intake air box 36. A front throttle body 71 is attached to the front cylinder 16a (see FIG. 1) of the engine 16, and a rear throttle body 72 is attached to the rear cylinder 16b (see FIG. 1). The reference numeral 73 represents a fuel injection control unit.

Figure 4:
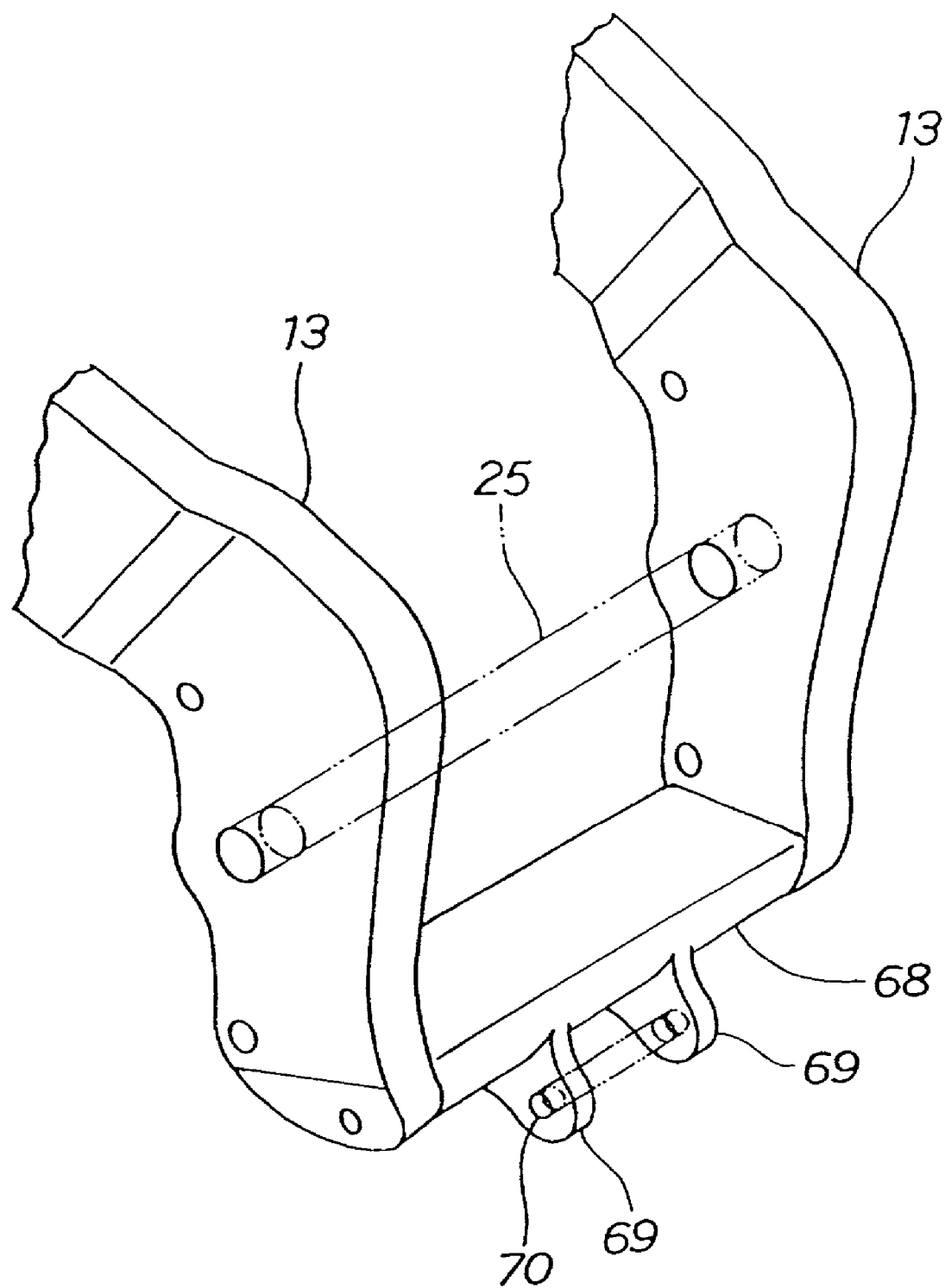
FIG. 4 is a fragmentary perspective view showing the vehicle frame structure according to the present invention.

FIG. 4 is a fragmentary perspective view showing the vehicle frame structure according to the present invention. Only the lower portions of the pivot brackets 13 are interconnected by the cross beam 68. The vehicle frame 14 shown in FIG. 1 is constructed of the head pipe 11, the main frames 12, the pivot brackets 13 shown in FIG. 4, and the cross beam 68. The link attachments 69 for connection to the second link 34 (see FIG. 2) are mounted on a lower portion of the cross beam 68.

Since only the lower portions of the pivot brackets 13 are interconnected by the cross beam 68, a large space is created between the upper portions of the pivot brackets 13 for accommodating various parts therein.

Figure 5:
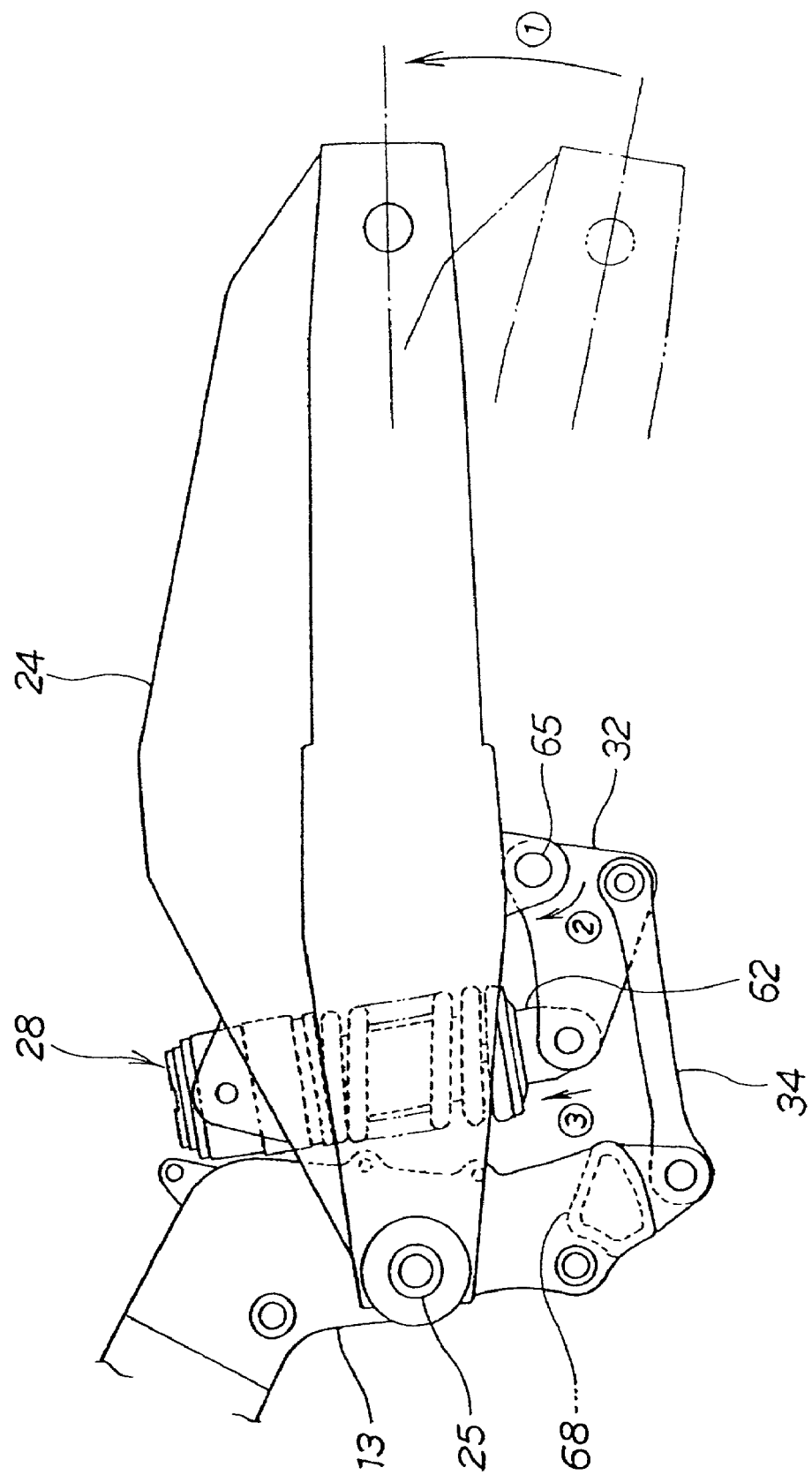
FIG. 5 is a view showing the manner in which the swing arm and the rear cushion unit mounted on the vehicle frame structure according to the present invention operate.

FIG. 5 is a view showing the operation of the swing arm and the rear cushion unit which are mounted on the vehicle frame structure according to the present invention.

When the end of swing arm 24 closer to the rear wheel 26 (see FIG. 1) is swung upwardly from the imaginary-line position (shown in FIG. 1) as indicated by the arrow ① the first link 32 attached to the lower portion of the swing arm 24 swings about the support shaft 65 as indicated by the arrow ②. Since the link attachment 62 of the rear cushion unit 28 is lifted as indicated by the arrow ③ in response to the swinging of the first link 32, the rear cushion unit 28 is compressed, generating damping forces.

At this time, even if the swing arm 24 swings to the uppermost position, since the rear cushion unit 28 does not enter between the upper portions of the pivot brackets 13, a large space is maintained between the upper portions of the pivot brackets 13.

As described above with reference to FIGS. 1, 3, and 4, the present invention resides in the motorcycle 10 having left and right main frames 12 extending rearwardly from the head pipe 11. The pivot brackets 13 are mounted on respective rear ends of the main frames 12. Furthermore, the pivot shaft 25 extends between the pivot brackets 13 with the rear wheel supporting swing arm 24 vertically swingably mounted on the pivot shaft 25. In addition, the rear cushion unit 28 has an upper end mounted on the swing arm 24 and a lower end coupled to the pivot brackets 13 in the position below the pivot shaft 25. The pivot brackets 13 are coupled to each other by a cross beam 68 at lower ends thereof.

Since the left and right pivot brackets 13 are coupled to each other by the cross beam 68 at their lower ends, a fuel tank, electric parts, or other parts, for example, can be clustered between the upper portions of the left and right pivot brackets 13. Accordingly, the parts can be disposed near the center of gravity of the vehicle body. Therefore, the maneuvering capability of racing and off-road vehicles incorporating such an arrangement can be increased.

When the vehicle is assembled, the distance that the worker needs to move can be reduced, and hence the productivity of the vehicle is increased. Furthermore, the size of the vehicle is reduced because of the clustered arrangement of the parts.

Figure 6:
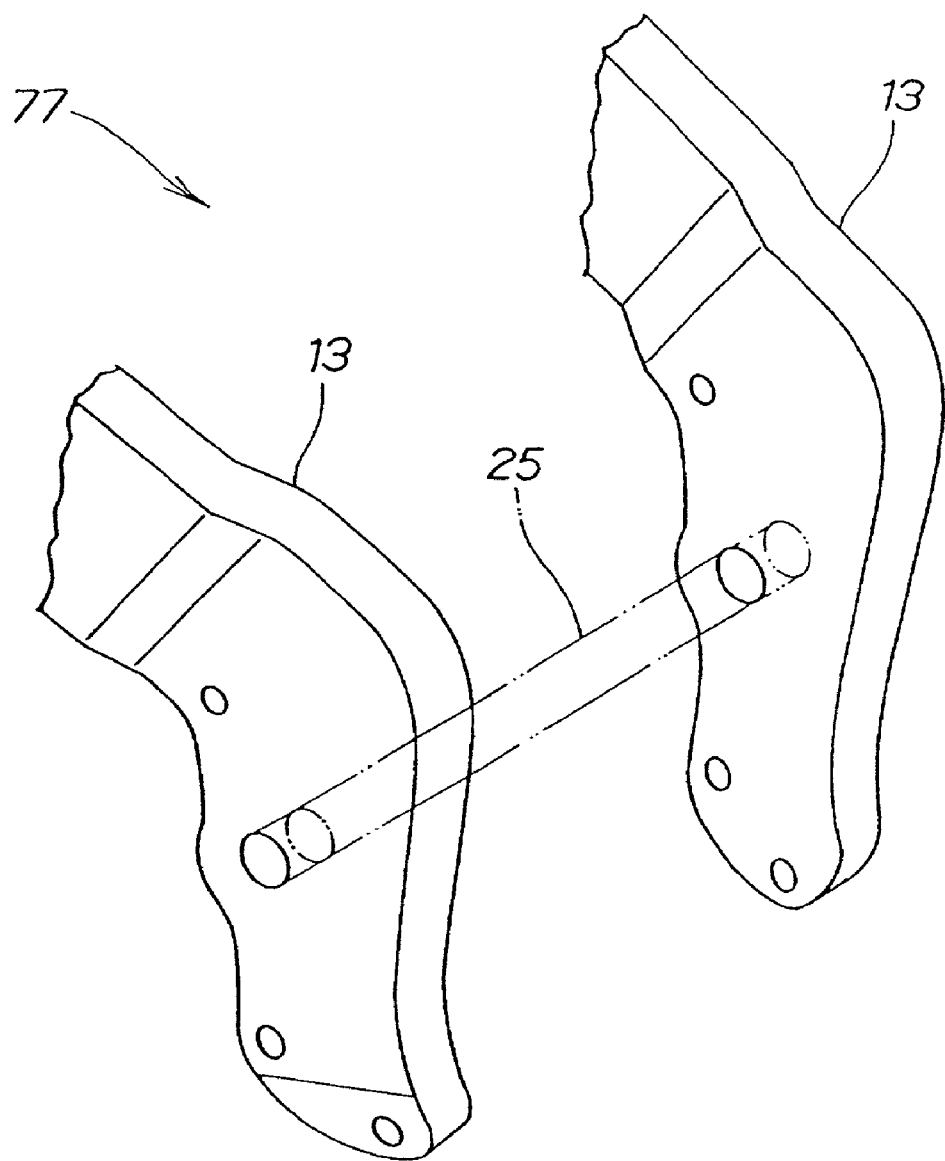
FIG. 6 is a fragmentary perspective view of a vehicle frame structure according to another embodiment of the present invention.

FIG. 6 is a fragmentary perspective view of a vehicle frame structure according to another embodiment of the present invention. Left and right pivot brackets 13 are independent of each other without being coupled to each other. A vehicle frame 77 is constructed of the head pipe 11, the main frames 12 shown in FIG. 1, and the pivot brackets 13 shown in FIG. 6.

The left and right pivot brackets 13 are supported by the engine 16 attached to these pivot brackets 13 and the pivot shaft 25 extending between the pivot brackets 13.

As described above with reference to FIGS. 1 and 6, the present invention resides in the motorcycle 10 having left and right main frames 12 extending rearwardly from the head pipe 11. The pivot brackets 13 are mounted on respective rear ends of the main frames 12. Furthermore, the pivot shaft 25 extends between the pivot brackets 13 with the rear wheel supporting swing arm 24 vertically swingably mounted on the pivot shaft 25. In addition, the rear cushion unit 28 has an upper end mounted on the swing arm 24 and a lower end coupled to the pivot brackets 13 in the position below the pivot shaft 25. The pivot brackets 13 are independent of each other and are not coupled to each other.

Since the left and right pivot brackets 13 are independent of each other and are not coupled to each other, a fuel tank, electric parts, or other parts, for example, can be clustered between the left and right brackets, and those parts can be disposed near the center of gravity of the vehicle body. Therefore, the maneuvering capability of racing and off-road vehicles incorporating such an arrangement can be increased.

As compared with a conventional arrangement in which a cross pipe is mounted on a vehicle frame, the vehicle frame 77 constructed of the head pipe 11, the main frames 12, and the pivot brackets 13 according to the present invention is simple in structure, resulting in a reduction in the cost to manufacture the vehicle frame 77.

Because the parts are clustered at the center of the vehicle, when the vehicle is assembled, the distance that the worker needs to move can be reduced, and hence the productivity of the vehicle is increased. The size of the vehicle is reduced because of the clustered arrangement of the parts.

Figure 7:
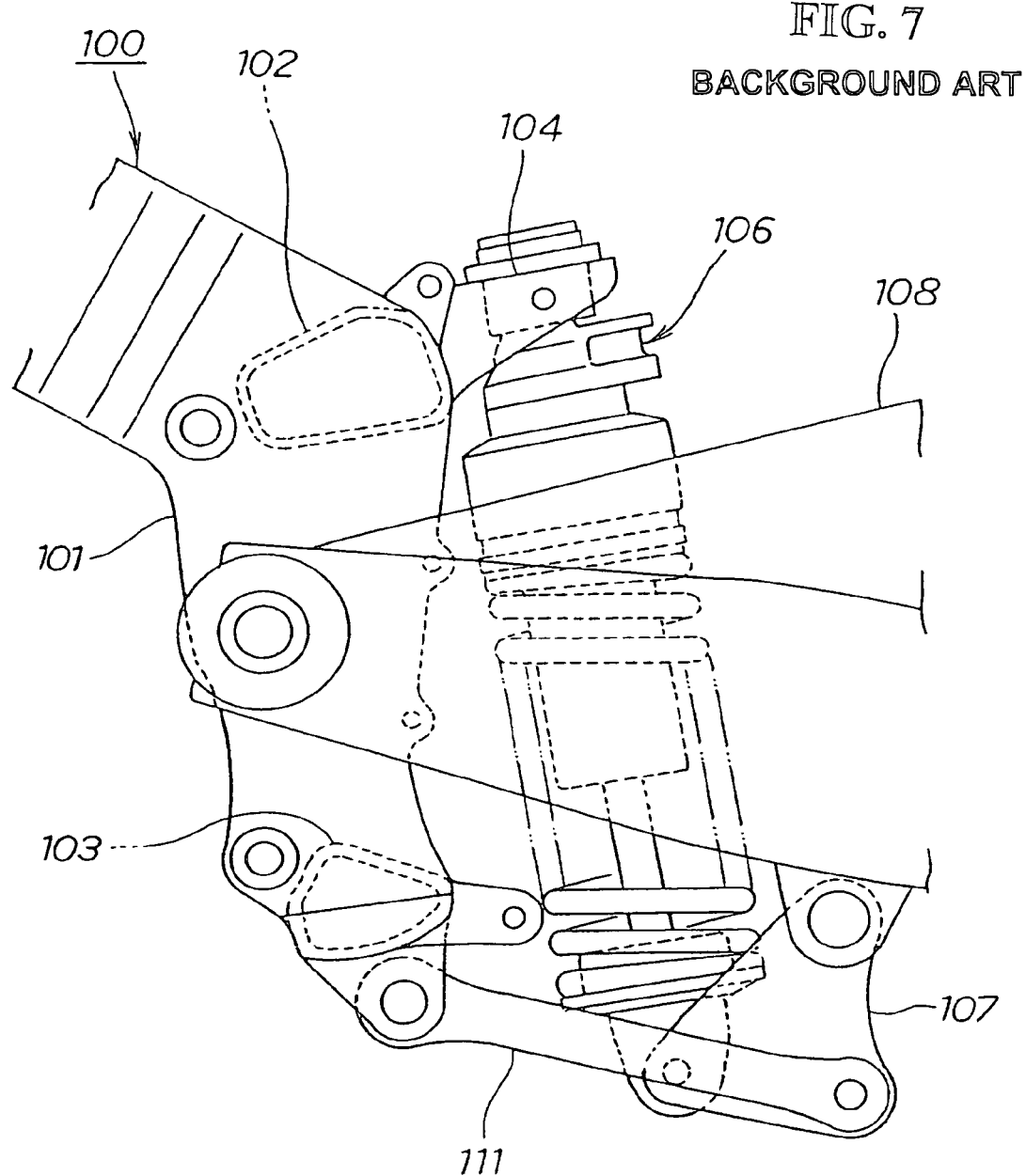
FIG. 7 is a fragmentary side elevational view showing a comparative example of a vehicle frame structure.

FIG. 7 is a fragmentary side elevational view showing a comparative example of a vehicle frame structure. Left and right main frames 101 (the main frame 101 remote from the viewer is not shown) of a vehicle frame 100 have rear portions coupled to each other by an upper cross pipe 102 and a lower cross pipe 103. A rearwardly projecting bracket 104 is mounted on the upper cross pipe 102, and a rear cushion unit 106 has an upper end attached to the bracket 104 and a lower end attached to a lower portion of a swing arm 108 by a link 107. The link 107 is attached to rear lower ends of the main frames 101 by a link 111.

Because the upper cross pipe 102 is disposed between the main frames 101, the space between the main frames 101 is reduced, and such a space near the center of the vehicle body cannot be utilized effectively.

The present invention with the above structure offers the following advantages:

In the vehicle frame structure for a motorcycle according to the first aspect of the present invention, the upper end of the cushion unit is mounted on the swing arm, the lower end of the cushion unit is coupled to the brackets in a position below the pivot shaft, and the brackets are independent of each other and are not coupled to each other. Therefore, a fuel tank, electric parts, or other parts, for example, can be clustered between the left and right brackets. Accordingly, the parts can be disposed near the center of gravity of the vehicle body. Therefore, the maneuvering capability of racing and off-road vehicles incorporating such an arrangement can be increased.

As compared with a conventional arrangement in which a cross pipe is mounted on a vehicle frame, the vehicle frame constructed of the main frames and the brackets according to the present invention is simple in structure, resulting in a reduction in the cost to manufacture the vehicle frame.

When the vehicle is assembled, the distance that the worker needs to move can be reduced, and hence the productivity of the vehicle is increased. The size of the vehicle is reduced because of the clustered arrangement of the parts.

In the vehicle frame structure for a motorcycle according to the second aspect of the present invention, the upper end of the cushion unit is mounted on the swing arm, the lower end of the cushion unit is coupled to the brackets in a position below the pivot shaft, and the brackets have respective lower ends coupled to each other by the cross beam. Consequently, a fuel tank, electric parts, or other parts, for example, can be clustered between the upper portions of the left and right brackets. Accordingly, the parts can be disposed near the center of gravity of the vehicle body. Therefore, the maneuvering capability of racing and off-road vehicles incorporating such an arrangement can be increased.

When the vehicle is assembled, the distance that the worker needs to move can be reduced, and hence the productivity of the vehicle is increased.

Furthermore, the size of the vehicle is reduced because of the clustered arrangement of the parts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle frame structure for a vehicle, comprising:
a head pipe;
left and right main frames extending rearwardly from said head pipe;
brackets mounted on respective rear ends of said left and right main frames, said brackets having respective lower ends coupled to each other by a cross beam;
a pivot shaft extending between said brackets;
a swing arm vertically swingably mounted on said pivot shaft; and
a cushion unit, said cushion unit having an upper end pivotably mounted on said swing arm at a position above a line formed between an axis of said pivot shaft and an axis of a rear wheel of the vehicle, and a lower end coupled to said brackets at a position below said pivot shaft,
wherein the swing arm includes an upper bracket for pivotably mounting the upper end of the cushion unit to an upper side of the swing arm, and a lower bracket for connecting the lower end of the cushion unit to a lower side of the swing arm via a first link a second link connected to a support shaft on inner sides of link attachments projecting downward from a central portion of the cross beam.

2. The vehicle according to claim 1, wherein the swing arm is mounted on outer sides of the brackets.

3. A vehicle, comprising:
a vehicle frame structure, said vehicle frame structure comprising:
a head pipe; and
left and right main frames extending rearwardly from said head pipe;
brackets mounted on respective rear ends of said left and right main frames, said brackets having respective lower ends coupled to each other by a cross beam;
a pivot shaft extending between said brackets;
a rear swing arm vertically swingably mounted on said pivot shaft;
a cushion unit, said cushion unit having an upper end mounted on said swing arm at a position above a line formed between an axis of said pivot shaft and an axis of a rear wheel of the vehicle, and a lower end coupled to said brackets at a position below said pivot shaft;
a front wheel and said rear wheel, said front wheel being rotatably supported by a front fork connected to said head pipe, said rear wheel being rotatably supported by said swing arm;
an engine, said engine being supported by said left and right main frames and said brackets; and a first link, said first link being generally triangular in shape and having three attachment points, a first attachment point being pivotally connected to said swing arm, a second attachment point being pivotally connected to said lower end of said cushion unit, and a third attachment point being pivotally connected to a second link,
wherein each of said attachment points is located on an apex of the triangular shaped first link, and
wherein a forward end of said second link is connected to a lower side of a central portion of the cross beam, and a rear end of said second link is connected to the third attachment point, thereby coupling the lower ends of the brackets and the first link.

4. The vehicle according to claim 3, wherein an entirety of each of said brackets is located rearward of the rearmost end of said left and right main frames.

5. The vehicle according to claim 3, wherein said swing arm is mounted on said pivot shaft on outer sides of the brackets.

6. The vehicle according to claim 3, wherein the cross beam coupling the lower end of the brackets includes a pair of link attachments and a support shaft extending between said pair of link attachments, and said second link is connected to said support shaft.

7. The vehicle according to claim 6, wherein said second link is connected to said support shaft on inner sides of the link attachments, and the swing arm is mounted on outer sides of the brackets.

8. A vehicle frame structure for a vehicle, comprising:
a head pipe;
left and right main frames extending rearwardly from said head pipe;
brackets mounted on respective rear ends of said left and right main frames, said brackets having respective lower ends coupled to each other by a cross beam;
a pivot shaft extending between said brackets;
a swing arm vertically swingably mounted on said pivot shaft;
a cushion unit, said cushion unit having an upper end mounted on said swing arm at a position above a line formed between an axis of said pivot shaft and an axis of a rear wheel of the vehicle, and a lower end coupled to said brackets at a position below said pivot shaft; and
a first link, said first link being generally triangular in shape and having three attachment points, a first attachment point being pivotally connected to said swing arm, a second attachment point being pivotally connected to said lower end of said cushion unit, and a third attachment point being pivotally connected to a second link,
wherein each of said attachment points is located on an apex of the triangular shaped first link, and said second link is connected to a lower side of a central portion of the cross beam, thus coupling the lower ends of the brackets and the third attachment point.

9. The vehicle frame structure according to claim 8, wherein an entirety of each of said brackets is located rearward of the rearmost end of said left and right main frames.

10. The vehicle according to claim 8, wherein said swing arm is mounted on said pivot shaft on outer sides of the brackets.

11. The vehicle according to claim 8, wherein a forward end of said second link is connected to the lower side of a central portion of the cross beam, and a rear end of said second link is connected to the third attachment point.

12. The vehicle according to claim 8, wherein the cross beam coupling the lower end of the brackets includes a pair of link attachments and a support shaft extending between said pair of link attachments, and said second link is connected to said support shaft.

13. The vehicle according to claim 12, wherein said second link is connected to said support shaft on inner sides of the link attachments, and the swing arm is mounted on outer sides of the brackets.

* * * * *